Patented Mar. 21, 1950

2,501,209

UNITED STATES PATENT OFFICE 2,501,209

N-PHENYL-3,5-DIETHYL-2-PROPYL-PYRIDINIUM COMPOUNDS

David Craig, Silver Lake, Ohio, assignor to The B. F. Goodrich Company, New York, N. Y., a corporation of New York No Drawing. Application January 21, 1947, Serial No. 723,455

8 Claims. (Cl. 260—290)

This invention relates to new compositions of matter and more specifically pertains to quaternary ammonium salts of N-phenyl-3,5-diethyl-2-propylpyridine.

These new quaternary ammonium salts are particularly useful as accelerators and activators for the sulphur vulcanization of rubbery materials which are capable of being vulcanized with sulphur or sulphur-bearing compounds known as sulphur-donors. Among the rubbery materials with which these new compounds may be used are all varieties of natural rubber, such as caoutchouc, gutta percha, balata, latex and reclaim rubber; and such synthetic rubber-like materials as can be vulcanized with sulphur including polymers of butadiene-1,3, isoprene, 2,3-dimethyl butadiene, piperylene, and the like and copolymers of these compounds with acrylonitrile, styrene, methyl acrylate, methyl methacrylate, isobutylene and other copolymerizable monomers. These new compounds may be added to the rubbery material on a roll mill or in an internal mixer or by any other suitable method. Other compounding ingredients such as any of the ordinary pigments, fillers, antioxidants or other accelerators of vulcanization may be employed together with my new materials. Small quantities may be used to achieve the desired results, either as vulcanization accelerators or activators. In general, 0.1% to 5% or more, based on the rubber composition, may be used.

My new compositions may also be used in biological applications and as reactants for the synthesis of other organic compounds. As examples of the former, compositions useful as insecticides, fungicides, mildewcides and as weed killing compositions may be prepared by mixing a small amount of one or more of the quaternary ammonium salts described herein, as an active ingredient, with an inert carrier.

The quaternary ammonium salts of my invention can be prepared in numerous ways. For example, the sulfhydryl salt, the quaternary ammonium hydrosulfide, can be isolated from the product of the reaction of N-phenyl-3,5-diethyl-2-propyldihydropyridine with sulphur; the quaternary ammonium chloride can be made by reacting the dihydropyridine with sulphur and hydrochloric acid, simultaneously; the acetate can be made by reacting the dihydropyridine with sulphur and glacial acetic acid simultaneously; and the iodide can be made by reacting the dihydropyridine with molecular iodine or with a combination of potassium iodide and potassium iodate. The starting reactant material, N-phenyl-3,5-diethyl-2-propyldihydropyridine, is one of the products formed by the condensation of aniline and butyraldehyde in the presence of a slightly acidic reaction medium.

The following specific examples illustrate the method of preparing these compounds and describe the physical properties of the compounds prepared. The parts given therein are by weight.

The dihydropyridine employed as a reactant was obtained from the products of the reaction of aniline with a commercial grade of butyraldehyde containing a minor portion of 2-ethylhexenal, the reaction being carried out at 40 to 100° C. in the presence of acetic acid. Example I illustrates this reaction.

EXAMPLE I 93 parts of aniline were added drop-wise to a mixture containing 288 parts of commercial butyraldehyde, 8.7 parts of acetic acid and 108 parts of water over a period of 30 minutes while the reaction mixture was stirred and cooled by external cooling to about 10° C. The reaction mixture was then heated to reflux temperature, and maintained at reflux temperature for five hours with the final temperature of the reaction medium being about 98° C. The reaction mixture was allowed to cool, whereupon it separated into a water layer and an oil layer. The water layer, which contained most of the acetic acid, was drawn off. The unreacted butyraldehyde and the 2-ethylhexenal in the oil layer were removed by steam distillation at atmospheric pressure. The remainder of the oil layer was dried at reduced pressure. The dried oil was light brown in color, had a refractive index of 1.575 (D scale at 20° C.), and was composed of a mixture of organic compounds, as set forth in Table I below:

TABLE I

*Composition of oil reaction product*

| Component | Percent |
|---|---|
| N-butylaniline | 0.6 |
| Reaction product of 2-mols butyraldehyde with 1 mol aniline | 8.5 |
| N-phenyl-3,5-diethyl-2-propyldihydropyridine (Product A) | 62.0 |
| Products B & C (Not identified, soluble in hydrochloric acid) | 23.0 |
| Residue (by difference) | 5.9 |

N-phenyl-3,5-diethyl-2-propyldihydropyridine, hereinafter referred to as product A, for simplicity, may be recovered from the above oily composition by such means as fractionation or by extraction with selective solvents. It has been found that the other products in the above oily composition have a relatively high solubility in dilute hydrochloric acid and, by making use of this solubility, product A can be conveniently isolated. The following Example II illustrates the isolation and purification of product A.

EXAMPLE II 2,000 parts of the oil reaction products obtained as in Example I above were mixed with 1,000 parts of crushed ice, 2,330 parts of cold water, and 1,310 parts of concentrated hydrochloric acid with stirring. About 30 to 35% of the oil dissolved by this treatment. The sharpness of separation was increased by the addition of 175 parts of benzene. The aqueous solution was drawn off and the benzene layer was washed free of acid, dried over potassium carbonate, and distilled at reduced pressure. Benzene and a small amount of 2-ethylhexenal came off in the first and second fractions followed by a small amount of acid insoluble nitrogen containing compound. The main fraction, product A, then distilled at about 125° C. at 0.5 mm. absolute pressure. Product A so recovered was light yellow in color, substantially odorless and had a refractive index of 1.5725 (D scale at 20° C.). After redistillation, the refractive index was raised to 1.5740. Chemical analysis showed that product A prepared in this way has the empirical formula $C_{18}H_{25}N$ and that structurally it is an N-phenyl-3,5-diethyl-2-propyldihydropyridine. It is believed to possess the 1,4-dihydro structure:

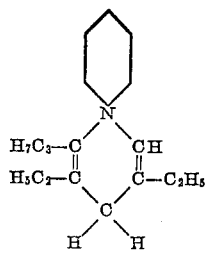

but the possibilities of the existence of the 1,2-dihydro and the 1,6-dihydro compounds as well as a mixture of all three cannot be overlooked. For all practical purposes, however, all three dihydro compounds will react the same giving the same quaternary salts. Accordingly, the products illustrated in the following examples will be shown as derivatives of the 1,4-dihydrocompound shown above.

EXAMPLE III

*Preparation of quaternary ammonium iodide*

25.5 parts of product A, 3.2 parts of sulphur, 62 parts of glacial acetic acid, 33.2 parts of potassium iodide, and 33.2 parts of water were added to a reaction vessel fitted with a stirrer, means for measuring the reaction temperature, a reflux condenser and means for heating or cooling the reaction mixture. The reaction mixture was stirred and heated for about four hours. The sulphur dissolved at about 60° C., and hydrogen sulfide began to evolve when the reaction mixture reached 95° C., at which time 25 parts of water were added. The reaction mixture was maintained at reflux temperature, about 95 to 100° C., for the remainder of the four hours. At this point the mixture was turbid, but all the oily material settled out when the mixture was allowed to stand. The resulting reaction mixture was cooled to room temperature and filtered. A gummy material which had precipitated during cooling was filtered out and was found to contain free sulphur. To the filtrate 90 parts of benzene were added causing the formation of three layers which were then drawn off and kept separate. The bottom layer was made alkaline by the addition of a 50% aqueous solution of sodium hydroxide. The middle layer was washed with 17 parts of benzene and made alkaline with the addition of a 50% aqueous sodium hydroxide solution. In both cases and oil came down which crystallized on standing. The crystals from the two layers were combined and dissolved in butanol and reprecipitated with ether to form a crop of light brown crystals, which were then dissolved in dry ethanol and precipitated again with ether to give bright-yellow, flake-like crystals, whose melting point was 107 to 108° C. The chemical analysis of this compound showed 56.76% carbon, 6.37% hydrogen and 33.34% iodine as compared to 55.66% carbon, 6.35% hydrogen and 33.33% iodine for the compound having the structure:

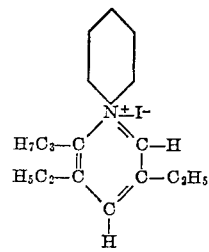

The compound was accordingly named N-phenyl-3,5-diethyl-2-propylpyridinium iodide. This quaternary ammonium iodide has been found to be very soluble in water, alcohols, ketones, and acetic acid, but it is insoluble in such hydrocarbons as benzene and hexane.

One reaction indicating the quaternary nature of the above iodide is the Freund reaction with excess methyl magnesium iodide in ether solution. The product prepared with the above iodide and excess methyl magnesium iodide was obtained in an 82% yield, had a refractive index of 1.5510 (D scale at 20° C.), and distilled at 105 to 108° C. at 0.2 mm. absolute pressure. A chemical analysis of this Freund reaction product showed that the chemical composition was 84.4% carbon, 9.9% hydrogen, and 5.5% nitrogen, which is in agreement with that calculated for $C_{19}H_{27}N$, the compound expected to be formed if the reactant is a quaternary ammonium compound.

EXAMPLE IV

*Preparation of quaternary ammonium chloride*

128 parts of product A, 16 parts of sulphur and 130 parts of concentrated hydrochloric acid were added to a reaction vessel fitted with a reflux condenser. The reaction mixture was agitated vigorously and the temperature rose quickly to 50° C. The mixture was then heated to reflux temperature and maintained at that temperature for a period of about seven hours, during which time hydrogen sulfide evolved from the reaction. After the reaction period, the resulting mixture was filtered to remove unreacted sulphur. 224 parts of carbon tetrachloride were added to the filtrate, and an oily layer settled out and was drawn off. The aqueous layer was extracted again with 317 parts of carbon tetrachloride, and the resulting oily layer was drawn off. The water layer was distilled at 60° C. and 6 mm. absolute pressure to remove the water whereupon 106 parts of a dark, viscous, water-soluble liquid distilland remained. This compound was found to possess the formula:

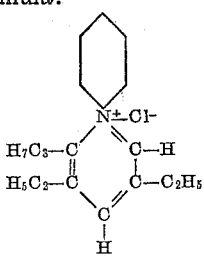

and is accordingly named 4-phenyl-3,5-diethyl-2-propylpyridinium chloride.

This compound is believed to be formed as follows:

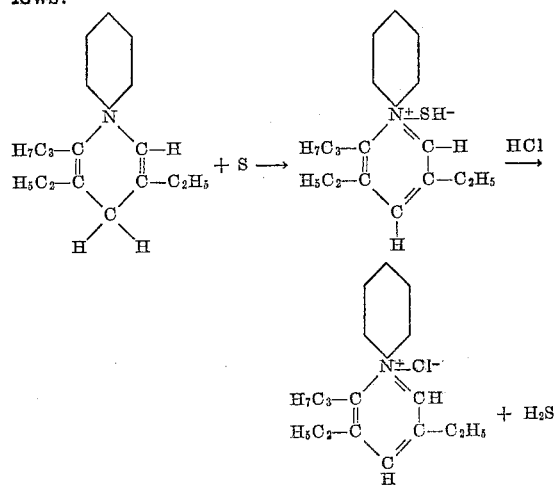

EXAMPLE V

*Preparation of quaternary ammonium acetate*

12.8 parts of product A, 16 parts of sulphur, 150 parts of glacial acetic acid and 150 parts of water were placed in an externally heated reaction vessel. At 88° C. the sulphur dissolved in the oil, which was still light in color. At 100° C. the oil layer became almost black and H2S came off in copious quantities. At 102° C. the oil layer that had been floating began to settle. After two and one-half hours of refluxing, the reaction mixture was cooled and the dark oil was drawn off. To the remaining material there was added 30 parts of chloroform, which dissolved readily. This solution containing choloroform was then extracted five times with 32 parts of carbon tetrachloride each time. The five extracts were combined and distilled at 60° C. and 0.15 mm. pressure absolute. By this means there was recovered as the distilland substantially the theoretical yield of N-phenyl-3,5-diethyl-2-propylpyridinium acetate, a red oil that was soluble in water. This compound has the following structure:

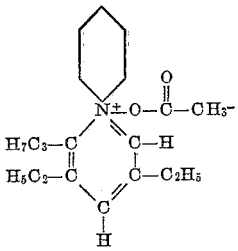

EXAMPLE VI

*Preparation of quaternary ammonium stearate*

16 parts of the above prepared acetate were mixed with 12.9 parts of stearic acid. The mixture was heated to 110° C. at 30 mm. absolute pressure and distilled under these conditions to remove the acetic acid formed. The distilland was removed and cooled. The product recovered had the following structural formula:

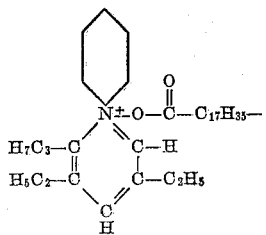

and accordingly is named N-phenyl-3,5-diethyl-2-propylpyridinium stearate. This compound has a melting point of 32° C., and was recovered in substantially a quantitative yield.

EXAMPLE VII

*Preparation of quaternary ammonium acid sulfate*

40 parts of the quaternary acetate prepared as in Example 5 and four parts of concentrated sulphuric acid were placed in a glass-lined externally heated reaction vessel and distilled at about 1 mm. absolute pressure. The distilland was a viscous liquid which crystallized when cooled. It was recovered in substantially the theoretical yield. The melting point of this product after precipitating from an acetone solution with ether was 155 to 158° C. The structure of this compound was determined to be

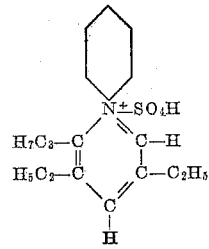

It is accordingly named N-phenyl-3,5-diethyl-2-propylpyridinium acid sulfate.

EXAMPLE VIII

*Preparation of quaternary ammonium benzothiazyl-2 mercaptide*

To 1.9 parts of sodium benzothiazyl-2-mercaptide dissolved in ten parts of water, there was added 3.8 parts of the quaternary ammonium iodide prepared in Example III. The iodide dissolved and a light-brown oil was formed. The oil layer was separated from the water layer and was washed with water. On standing, the oil layer crystallized to form an oily solid which is believed to be substantially the following compound:

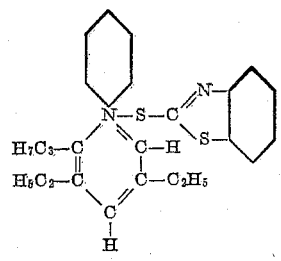

This compound is accordingly named N-phenyl-3,5 - diethyl-2-propylpyridinium benzothiazyl-2-mercaptide.

Other quaternary ammonium salts can be prepared by employing other acidic materials and proceeding as described in Examples IV to VII, or by reacting the sodium salt or other water-soluble salts of slightly acidic materials with the iodide or the chloride quaternary ammonium salt as in Example VIII. For example, quaternary ammonium monocarboxylic acid salts of N-phenyl-3,5-diethyl-2-propylpyridine similar to the acetate and stearate may be prepared in the manner of Examples V and VI using other monocarboxylic acids, either aliphatic or aromatic, such as propionic, butyric, valeric, caproic, lauric, myristic, palmitic, oleic, benzoic, lactic, salicylic, phenylacetic acids or the like. Also quaternary ammonium bromides and fluorides may be prepared in the manner of Examples III and IV and quaternary ammonium salts of other sulfur compounds containing an acidic thiol group such as the various dithiocarbamic acids, xanthic acids, mercapto-thiazoles, mercapto-thiazolines and the like may be prepared in the manner of Example VIII. It is accordingly to be understood that the invention is generic to quaternary ammonium salts of N-phenyl-3,5-diethyl-2-propylpyridine, and is not limited to salts containing specific acid radicals.

As an indication of the ability of the quaternary ammonium salts of my invention to accelerate the sulphur vulcanization of rubber and rubber-like materials, the following tabulated results illustrate the effect produced in rubber by some of the above prepared compositions. A typical tire tread stock containing 100 parts of rubber, 50 parts of medium carbon black, 50 parts of zinc oxide, 5 parts of sulphur, 3.5 parts of stearic acid, 3 parts of pine tar, 1 part of antioxidant, and 1 part of a quaternary ammonium salt as noted, was prepared, all parts being by weight. After vulcanizing in a press at 280° F., the resulting compositions had the physical properties as shown in Table II, in which T is the ultimate tensile strength in pounds per square inch, and E is the ultimate elongation in per cent.

TABLE II

| | Accelerator | Time of Cure, Min. | T | E |
|---|---|---|---|---|
| A | N-phenyl-3,5-diethyl-2-propylpyridinium chloride | 15<br>30<br>45<br>75 | 3,150<br>3,775<br>4,225<br>4,475 | 735<br>700<br>670<br>630 |
| B | N-phenyl-3,5-diethyl-2-propylpyridinium acetate | 15<br>30<br>45<br>75 | 2,725<br>3,875<br>4,100<br>4,300 | 725<br>720<br>690<br>625 |
| C | N-phenyl-3,5-diethyl-2-propylpyridinium stearate | 15<br>30<br>45<br>75 | 1,700<br>2,800<br>3,250<br>3,850 | 760<br>785<br>725<br>670 |
| D | N-phenyl-3,5-diethyl-2-propylpyridinium acid sulfate | 15<br>30<br>45<br>75 | 2,650<br>3,675<br>3,950<br>4,050 | 735<br>725<br>685<br>620 |

Without the presence of the quaternary ammonium salt the physical properties of the illustrated rubber composition were too low to measure for heating times up to 45 minutes, thereby indicating the effectiveness of the compounds set forth as vulcanization accelerators.

While I have disclosed specific embodiments of my invention, I do not thereby desire or intend to limit myself solely thereto for the precise proportions of the materials utilized may be varied and other materials having equivalent chemical properties may be employed if desired, without departing from the spirit and scope of the invention as defined in the appended claims.

I claim:

1. N-phenyl-3,5-diethyl-2-propylpyridinium chloride having the formula:

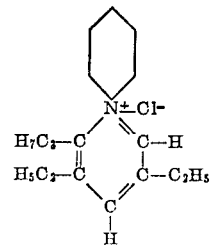

2. N-phenyl-3,5-diethyl-2-propylpyridinium acetate having the formula:

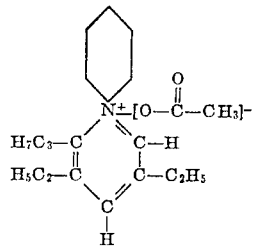

3. N-phenyl-3,5-diethyl-2-propylpyridinium benzothiazyl-2-mercaptide having the formula:

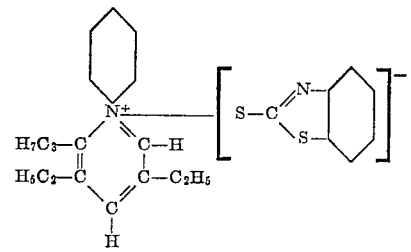

4. N-phenyl-3,5-diethyl-2-propylpyridinium compounds having the structure:

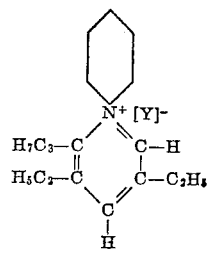

where Y is an acid radical.

5. N-phenyl-3,5-diethyl-2 - propylpyridinium halides having the structure:

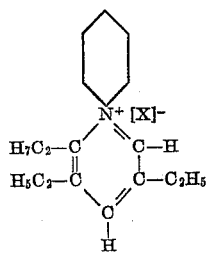

where X is a halide radical.

6. N-phenyl-3,5-diethyl-2 - propylpyridinium aliphatic monocarboxylates having the structure:

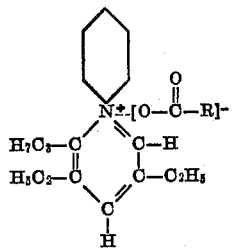

where R is an aliphatic hydrocarbon radical.

7. N-phenyl-3,5-diethyl-2 - propylpyridinium stearate having the structure:

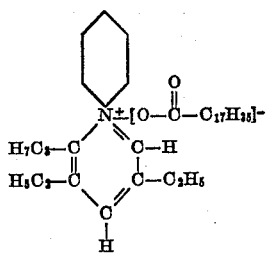

8. N-phenyl-3,5-diethyl-2 - propylpyridinium hydrogen sulfate having the structure:

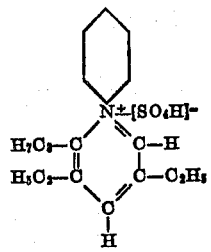

DAVID CRAIG.

No references cited.

Certificate of Correction

Patent No. 2,501,209                                                       March 21, 1950

DAVID CRAIG

It is hereby certified that error appears in the printed specification of the above numbered patent requiring correction as follows:

Column 9, line 8, for that portion of the formula reading "$H_7C_2$" read $H_7C_3$;

and that the said Letters Patent should be read with this correction therein that the same may conform to the record of the case in the Patent Office.

Signed and sealed this 4th day of July, A. D. 1950.

[SEAL]

THOMAS F. MURPHY,
*Assistant Commissioner of Patents.*